United States Patent [19]

Field

[11] Patent Number: 4,636,412
[45] Date of Patent: Jan. 13, 1987

[54] ENEMA BAG

[75] Inventor: Peter W. Field, Concord, Australia

[73] Assignee: Field Group Research Pty. Ltd., New South Wales, Australia

[21] Appl. No.: 680,808

[22] Filed: Dec. 12, 1984

[63] Continuation of PCT AU84/00060, Apr. 13, 1984, published as WO84/04037, Oct. 25, 1984

[30] Foreign Application Priority Data

Apr. 13, 1983 [AU] Australia .............................. PF8885

[51] Int. Cl.$^4$ ......................... A61F 7/04; B65D 30/08
[52] U.S. Cl. .................... 428/35; 428/476.1; 428/516; 428/518; 383/113; 604/262
[58] Field of Search ..................... 604/262; 383/9, 109, 383/113, 119; 222/570; 428/35, 475.8, 476.1, 516, 518

[56] References Cited

U.S. PATENT DOCUMENTS

| | | | |
|---|---|---|---|
| Re. 26,674 | 9/1969 | Ilg ........................................ | 604/262 |
| 4,212,299 | 7/1980 | Yokokoji et al. ................... | 604/262 |
| 4,284,672 | 8/1981 | Stillman ........................... | 428/476.1 |
| 4,407,873 | 10/1983 | Christensen et al. ................ | 428/35 |
| 4,479,989 | 10/1984 | Mahal ..................................... | 428/35 |
| 4,482,585 | 11/1984 | Ohodaira et al. .................... | 604/262 |
| 4,497,857 | 2/1985 | Bonis ..................................... | 428/35 |
| 4,528,220 | 7/1985 | Hwo ..................................... | 383/109 |

Primary Examiner—John E. Kittle
Assistant Examiner—James J. Seidleck
Attorney, Agent, or Firm—Barnes & Thornburg

[57] ABSTRACT

There is provided a container useful for both storage and administration of a liquid medical composition for example as a barium enema the container comprising a flexible wall (1) and having a port (10) adapted for connection to a tube and having a composite wall including an innermost layer (11) which is inert to the content and is heat sealed with the port and a non innermost layer (12) which is resistant to water vapor transmission, the composite having a resistance to tear propogation in excess of 50 g/mil.

10 Claims, 2 Drawing Figures

ENEMA BAG

This is a continuation of PCT application No. PCT/AU84/00060, filed Apr. 13, 1984 and claiming the priority date of Australian patent application No. PF8885, dated Apr. 13, 1983.

TECHNICAL FIELD

This invention relates to a container useful for storage and administration of medical compositions.

BACKGROUND ART

For various medical procedures it is necessary to dispense a liquid composition from a reservoir via a tube to a patient or to transfer a composition from a patient to a reservoir via a tube. Examples involving such procedures include the administration of saline solutions from a reservoir to a patient, the continuous collection of urine for analysis in a pouch reservoir and the administration of a barium enema prior to radiography from an enema bag.

The specialized reservoirs used for administration of solutions and suspensions have in common that they are provided with at least one integral delivery tube or means for connection to a delivery tube. Usually they have been provided in addition with a filling port and have been made from glass, rubber, PVC and even metal according to administration requirements. The reservoirs and associated fittings are manufactured in many forms and sizes each adapted to serve a particular function. Some are part of highly specialized apparatus. Others are simple PVC or polyethylene bags with integral tubular fittings.

The compositions administered are liquids which term as herein used includes solutions suspensions and emulsions. Traditionally the compositions were made up immediately prior to use although nowadays many of the required compositions are prepared in bulk by specialist manufacturers, packaged in unit dose or other convenient package size and marketed. Typically the marketed compositions are packaged in glass bottles for sale. Such compositions when purchased are transferred shortly prior to use from the container in which purchased to the reservoir from which they are to be administered via a reservoir filling port or other opening of the reservoir.

Hithereto reservoirs of the type used for administration of such composions have not been used by manufacturers of the compositions as a package or container in which to market their product. Likewise samples collected in such apparatus has been transferred to other containers for long term storage. That is partly because the specialized reservoirs are of too costly a construction to be used as storage containers or as packaging but more importantly because storage and handling in commerce imposes requirements different from those of medical administration. In practice compositions of the kind under consideration may be stored for periods as long as 12 months in the package prior to use. The package container must be inert to the content for at least that period and must be able to withstand the rigours of handling and transport without leakage or damage. For commerce the package should be of a size shape and weignt which permits economical handling and is of acceptable manufacturing cost. Importantly there must be substantially no water vapour loss which would allow concentrations to alter during storage.

Likewise the packages or containers in which such liquid compositions have been marketed have hitherto been unsuitable for dispensation of contents to, or collection of samples from, patients via a tube. That is not only because the container lacks a suitable shape and/or fittings but because the material of which the packaging container was made have either been unsuitable for the construction of specialized reservoirs for medical use or have other disadvantages in practice. Glass reservoirs are dangerous to pressurize and suffer from a number of disadvantages including fragility, high cost, high weight, inflexibility.

The disadvantages of prior art may conveniently be exemplified by reference to enema bags such as used for administration of a barium enema prior to single or double contrast radiography.

A conventional enema bag is an elongate, generally tubular, reservoir having a filling port at one end and provided at the other end with a delivery tube or means such as a spigot for connection with an enema delivery tube whereby the reservoir is placed in communication with a rectal tip adapted for introduction of the reservoir contents into the rectum of a patient.

The enema delivery tube is usually provided with a valve or clamp between the reservoir and the rectal tip. The reservoir filling port is provided with a closure.

For use in double contrast radiography of, for example, the colon an additional requirement is that the bag be capable of being pressurised. After the colon has been filled with the barium enema, the colon is drained leaving a film on the colon wall and air from the bag is usually admitted to inflate the colon. For that purpose the enema bag and filling port closure must be pressure tight. Enema bags made from rubber and stainless steel vessels have been preferred for pressure resistance but are not transparent.

Hitherto compositions for use as a barium enema have been prepared immediately prior to use by dispersing barium sulphate in a required quantity of water or have been purchased as a predispersed suspension of barium sulphate in water. In either case the dispersion is first made up to a required solids content and then admitted from the preparation vessel or storage container via the filling port into the enema bag. As hereinafter used the term "barium enema" refers to a suspension in liquid and not to a dry powder.

As considerable time is required to prepare a suspension from dry powder the use of the predispersed barium enemas is generally most convenient but some adjustment of concentration or viscosity is often desired by the radiographer prior to administration, as dictated by the method of patient preparation or suspected pathology.

Predispersed barium enemas marketed in glass bottles have not avoided the inconvenience of transfer to a flexible enema bag prior to use. It would be desirable to provide an enema bag at sufficiently low cost as to render it disposable and suitable to be pre-packed with a barium suspension.

An object of the invention is to provide an improved container suitable for the storage and/or transport in commerce of a liquid intended to be transferred to a patient via a tube.

A further object of the invention is to provide a container useful in medical procedures which is suitable for transport and/or long term storage of a liquid composition and which is adapted to facilitate dispensation to, or reception from, a patient of the composition via a tube.

A further object of the invention is to provide a reservoir useful in the dispensation to or reception from a patient via a tube of a liquid composition or suspension and which avoids at least some of the disadvantages of the prior art. Desirably the reservoir should be capable of construction at a sufficiently low cost as to be disposable.

DISCLOSURE OF INVENTION

According to one aspect the invention consists in a container suitable for handling and storage of a liquid and adapted to facilitate transfer to or from a patient of the liquid during a medical procedure said container comprising:
a composite flexible wall or walls,
port means for communication with the interior of the container and adapted for connection to a tube,
the composite wall including an innermost layer which is substantially inert towards the liquid composition and which is heat sealed with the port means,
a non innermost layer which is resistant to water vapour transmission, the composite having an impact resistance (as measured by ASTM D1909-75 Method A) in excess of 1.20 kg.

By way of example only an embodiment of the invention will now be described with reference to the accompanying drawings wherein.

DESCRIPTION OF PREFERRED EMBODIMENTS

The embodiment described is an enema bag but it will be understood that the invention is applicable to other reservoirs from which, or to which, compositions are supplied via a tube during medical procedures.

Figure 1:
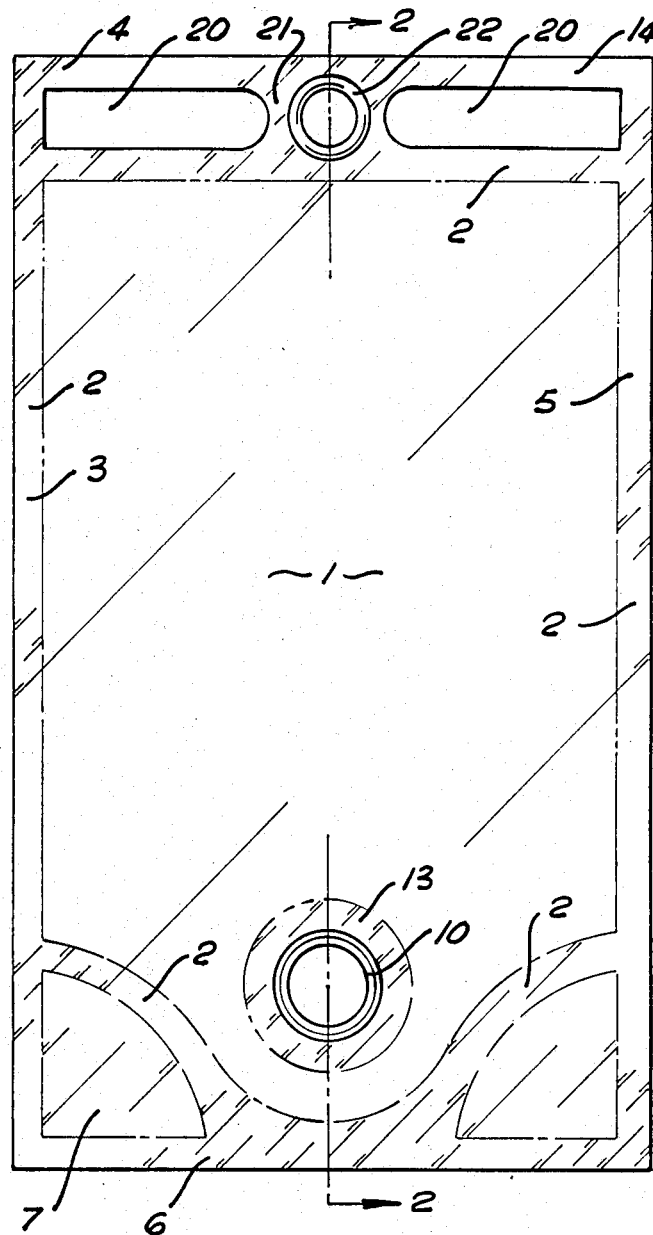
FIG. 1 shows a view of an enema bag according to the invention in front elevation.
Figure 2:
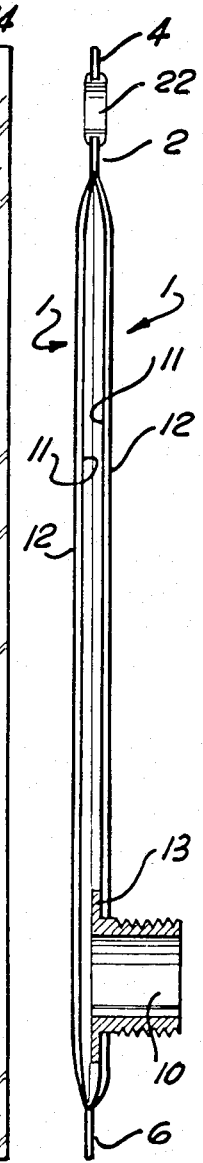
FIG. 2 shows a cross-section of the enema bag taken on line 2—2 of FIG. 1.

The enema bag comprises a flexible pouch made from a water impermeable material. The pouch has two walls (of which only one is seen in FIG. 1) in overlying relationship. Walls 1 are connected at a perimeter 2 to define a sealed volume of, for example, $2\frac{1}{2}$-$3\frac{1}{2}$ liters therebetween.

In the example illustrated walls 1 are made from a co-extruded plastics film, having an inner layer 11 of linear low density polyethylene ("LLDPE") 40 microns thick and an outer layer 12 of biaxially oriented nylon 18 microns thick. Intermediate the inner and outer layer is a layer of high density polythylene ("HDPE") 60 microns thick. Overlying walls are connected by heat sealing or welding at perimeter 2 of the enclosed space. The outer layer is transparent but accepts printing. The inner layer is transparent domically inert and free of plasticizers. The intermediate layer is transparent and impermeable to water vapour.

A tubular polypropylene port or spout 10 communicates with the interior of the pouch defined by perimeter 2 and is welded with wall 1 at a flange 13 extending radially of spout 10 at the proximate end. Spout 10 at or near the distal end may be provided with a closure (not illustrated), for preference a tamper proof cap, and is threaded for connection to an enema delivery tube after removal from spout 10 of the closure.

Perimeter 2 extenos adjacent the left (as viewed in FIG. 1) edge 3 and is spaced by a margin from the top edge 4. Perimeter 2 extends adjacent the right edge 5. The lower portion 7 of perimeter 2 is shaped to drain the enclosed volume towards tubular spout 10 and preferably also to minimize dead volume in the vicinity of the spout.

The spout construction is reinforced by virtue of welds extending along the lower edge 6 and the lower portion of sides 3 and 5.

Upper edge 4 is also provided with an adjacent weld strip 14 spaced apart from the upper portion 15 of the perimeter 2 weld and two slots 20 separated from each other by web 21 may optionally be provided as carrying means for the enema bag.

Web 21 is optionally provided with an eye or eyelet 22 whereby the enema bag may be supported, for example from a hook, in a draining orientation so as to drain contents through a tuoe connected to spout 10.

The enema bag described has a capacity of for example 2.5-3.5 liters and when partly filled with a diluted 75% w/w barium sulphate suspension has a very considerable weight by virtue of the density of the barium sulphate. In addition the bag may be pressurized in use and must be able to withstand at least 25 KPA internal pressure. Embodiments as described have been tested to 150 KPA. During mixing the pouch is flexed. It will therefore be understood that the materials, weld strength and general construction must be able to withstand severe conditions without failure.

In the example illustrated the co-extruded film was selected as here:nafter described to have negligible water transmission rate and so that all materials to conform with FDA and world health regulations for suitability for food and pharmaceutical contact.

In use the enema bag is filled with a predetermined quantity of barium enema being a barium sulphate in aqueous suspension via spout 10 which is then sealed for preference with a tamper proof closure. The filled sealed enema bag may then be stored, sold, transported and otherwise handled. The suspension may be maintained in the enema bag without deterioration, conveniently carried e.g. by inserting fingers through slots 20 and may be stored flat.

Water additions may be made, if required, prior to administration of a barium enema by the steps of removal of the closure, addition of a required amount of water, replacement of the closure, and squeezing or agitating the bag to obtain uniform dilution or suspension. The closure may then be removed and, a rectal tip connected by means of a delivery tuoe having a screw connector adapted for connection to spout 10.

Typically in use for double contrast radiography of the colon, the pouch is first pressurized by introducing air at 10-25 KPA into the bag via the delivery tube.

The bag is suspended by eye 21 at a suitable height above the patient and the barium enema injected into the colon by drainage from the enema bag in the usual manner and assisted by the air pressure. The bag is subsequently lowered and inverted and the barium suspension is drained from the colon into the bag. The gas in the bag is next used to inflate the barium lined colon for double contrast examination with further pressure being applied by external pressure on the bag, for example by squeezing. The levels in the bag are at all times easily visible.

The enema bag may of course also be used in other procedures in which the colon is pressurized by a gas introduced downstream of the enema bag spout for example into the delivery tube or enema.

It will be understood that reservoir may be designed for uses other than as an enema bag. The shape and volume of the bag and disposition of inlets or outlets may readily be altered to suit such other requirements. Other inlet and outlet means, for example spigots or tubes having a breakseal may be substituted for spout 10.

Other wall constructions within the scope of the invention will now be described.

The composite walls may be made for example from coextruded film, laminated films, or from films joined each to the other by fusion or adhesives. The innermost layer is selected so as to be chemically inert towards the content or intended content and so as to be substantially free from plasticizers which might leach into the content. The innermost layer must also be able to form a seal with the port flange or with a tubular spiggot or with other tube connectors preferably by means of a heat sealing or welding process for example radio frequency welding. Preferably the inner layer is selected from the polyolfin polymers for example low density polyethylene ("LDPE"), linear low density polyethylene ("LLDPE"), polypropylene ("PP"), ionomer (a modified polyethylene sold under the trade name SURLIN by Du Pont) or Ethylene Vinylacetate ("EVA"). Of these linear low density polyethylene is most highly preferred for the innermost layer because of its superior heat seal strength, high resistance to tear propogation, chemical inertness and contribution to water vapour transpiration resistance.

For an outer layer Nylon and more preferably biaxially oriented nylon are selected as Nylon has been found to impart high tensile strength and abuse resistance and enables the package to support the content when hung from a hook. Use of nylon as the outer layer permits the article to be printed and decorated, and confers high dimensional stability, abrasion resistance and scuff resistance to the container. Less preferred plastics which can be substituted for nylon in giving strength to the composite include high density polyethylene, polypropylene each of which could be orientated or non-orientated.

It is important that the walls provide sufficient a moisture vapour barrier such that there is no significant change of composition of contents over the normal storage life of the product. For some purposes a thick film of LLDPE provides a sufficient moisture barrier although PVDC, HDPE, PVC, PP, nitrile or vapour deposited metal may be used. In the latter case a window must be provided if transparency is important.

The Water Vapour Transmission Rate for various suitable wall composites according to the invention is given in Table I under conditions specified in Australian Standard Test Method ASTM D882. It will be understood that at lower temperature and humidity the transmission rate will be a fraction of the rates shown in Table I.

TABLE I

| SAMPLE | Inner Layer[1] | Outer Layer[1] | Intermediate Layer (S)[1] | WVTR[2] g/m$^2$ |
|---|---|---|---|---|
| A | LLDPE (50) | NYLON (18) | | 7.7 |
| B | LLDPE (40) | HDPE (60) | NYLON (18) | 2.6 |
| C | LLDPE (40) | PVDC (5) | PET (15) | 2.9 |
| D | LLDPE (40) | LLDPE (20) | AL/PET (12) | 1.2 |
| E | LLDPE (40) | NYLON (18) | ACRYLONITRILE (20) | 8.8 |
| F | LLDPE (40) | LLDPE (30) | PVDC (5)/PET (15) | 2.4 |
| G | LLDPE (40) | LLDPE (20) | PCDC (5)/NYLON (18) | 2.6 |

[1] Numerals in brackets refer to film thickness in microns
[2] WVTR is the Water Vapor Transpiration Rate in g/m$^2$ 24 hours at 37.8° and 90% RH.

The composition of the walls is selected so that the Water Vapour Transmission Rate (when measured according to ASTM E96) is less than 10 g/sq.m/24 hrs. at 37.8° C. and 90% RH although preferably the rate is less than 1.4 g/sq.m/24 hrs. at 25° C. and 90% RH.

The composition of the walls is selected to have an impact resistance when measured by the technique described in ASTM D1709-75 Method A is in excess of 1.20 Kg.

This method covers the determination of the energy that causes a film to fail under specified conditions of impact of a free falling dart. This energy is expressed in terms of the weight (mass) of the missile falling from a specified height which would result in 50% failure of specimens tested.

This method employs a dart with a 38 mm (1.5 in) diameter hemispherical head dropped from a height of 0.66 m (26 in). This method may be used for films whose impact resistances require masses of about 50 g or less to about 2 kg to fracture them.

A metallized polyester film of 70 mil thickness had a puncture range of 1.1 kg.–1.16 kg under comparable conditions.

The composition of the composite walls is selected so that the resistance to tear propogation (as measured by ASTM D1922, Elmendorf) is at least 50 g/mil. and preferably is greater than 100 g/ml., more preferably greater than 400 g/ml.

The composition of the composite walls is preferably selected so as to have a tensile strength (when measured according to ASTM D882) in excess of 2000 psi at break and preferably above 7000 psi at break. Some of the composite compositions described in Table I have a tensile strength of 15000 psi.

Preferred embodiments of containers according to the invention enable a liquid composition to be packaged at a manufacturing plant, transported and handled during commerce and safely stored if necessary for many months prior to use. The packages have dimensional stability and accept printing. Because of their strength and abuse-resistance, the bags do not require a rigid outer protective carton or package and do not burst or split. The water transpiration rate is so low that the contents remain of substantially constant concentration. If a lowered concentration is required the package may conveniently be opened prior to use and the content diluted, the flexibility of the package permitting mixing by squeezing. A tube is readily fitted to the threaded port and contents may thus be administered directly from the container without transfer to another reservoir. The package may be internally pressurized if desired and is transparent and flexible thus facilitating certain medical procedures. The container is of sufficiently low manufacturing cost that it may be considered disposable.

Those skilled in the art will readily appreciate the extent to which the dimensions, materials and construction of the container or reservoir described herein may be varied from the example described without departing from the teaching hereof and such variations are comprehended within the scope hereof.

I claim:

1. A container suitable for handling and storage of a liquid and adapted to facilitate transfer to or from a patient of the liquid during a medical procedure said container comprising:

a transparent or translucent composite flexible wall or walls;

port means for communication with the interior of the container;

the composite wall including an innermost layer which is substantially inert towards the liquid and which is heat sealed with the port means;

a first non-innermost layer selected from the group consisting of polyvinylidene chloride, high density polyethylene, polyvinyl chloride and polypropylene;

and a second non-innermost layer differing from the first, and selected from the group consisting of nylon, high density polyethylene, and polypropylene, said layers being selected so that the composite has an impact resistance (as measured by ASTM D 1909-75 method A) in excess of 1.2 kg. and has a moisture transpiration rate of less than 7.7 g./m$^2$/24 hours when measured at 37.8° C. and 90% RH.

2. A container according to claim 1 wherein the second non-innermost layer is biaxially oriented.

3. A container according to claim 1 in the form of a transparent hollow flat pouch.

4. A container according to claim 3 wherein the moisture loss through the wall is less than 1.4 g./sq. M/24 hours when measured at 25° C. and 90% RH.

5. A container according to claim 4 wherein the tensile strength of the wall is greater than 7000 psi when measured by ASTM D-882.

6. A container according to claim 5 wherein the tear strength of the wall is greater than 100 g./mil when measured according to ASTM 1922.

7. A container according to claim 1 wherein the inner layer is a polyolefin selected from the group consisting of low density polyethylene, linear low density polyethylene, modified polyethylene, ethylene vinyl acetate and copolymers thereof, and the second non-innermost layer is selected from the group consisting of nylon, high density polyethylene and polypropylene.

8. A container according to claim 1 having a first non-innermost layer of high density polyethylene and a second non-innermost layer of nylon.

9. A container according to claim 1 when adapted for use as an enema bag.

10. A container according to claim 9 containing a radiopaque medium and having a tamperproof closure.

* * * * *